United States Patent
Higashi et al.

(10) Patent No.: US 6,846,557 B2
(45) Date of Patent: *Jan. 25, 2005

(54) LAMINATE

(75) Inventors: Kenichi Higashi, Sodegaura (JP); Yousuke Tsukuda, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/160,025

(22) Filed: Jun. 4, 2002

(65) Prior Publication Data

US 2003/0054187 A1 Mar. 20, 2003

(30) Foreign Application Priority Data

Jul. 3, 2001 (JP) ........................................ 2001-201964

(51) Int. Cl.[7] .................... B32B 27/30; B32B 27/32
(52) U.S. Cl. ................... 428/327; 428/328; 428/516; 428/517; 428/520
(58) Field of Search ................... 428/327, 328, 428/516, 517, 520

(56) References Cited

U.S. PATENT DOCUMENTS 6,692,821 B2 * 2/2004 Koyama et al. ............ 428/213

2001/0053454 A1 * 12/2001 Higashi et al. ............ 428/520

FOREIGN PATENT DOCUMENTS

| JP | 10-86301 A | 4/1998 |
|---|---|---|
| JP | 10-100329 A | 4/1998 |
| JP | 10-138415 A | 5/1998 |
| JP | 11-207896 A | 8/1999 |
| JP | 11-207898 A | 8/1999 |
| JP | 11-207899 A | 8/1999 |
| JP | 2001-310427 A | 11/2001 |

* cited by examiner

Primary Examiner—D. S. Nakarani
(74) Attorney, Agent, or Firm—Sughrue Mion, PLLC

(57) ABSTRACT

There are provided (I) a laminate comprising:

(i) a resin layer (A), which comprises a layer containing a propylene resin (a), (ii) a resin layer (B), which comprises a layer containing an acrylic resin (b) having a flexural modulus of from 100 to 1500 MPa, and (iii) a resin layer (C), which comprises a layer containing an acrylic resin (c), wherein the resin layers (A), (B) and (C) are laminated in this order, (II) a structure comprising said laminate, and (III) a process for producing said structure.

9 Claims, 1 Drawing Sheet

LAMINATE

FIELD OF THE INVENTION

The present invention relates to a laminate; a structure comprising said laminate and a polyolefin resin substrate; and a process for producing said structure.

BACKGROUND OF THE INVENTION

As a process for producing a resin molded article having a superior surface in its appearance property, there is known a process (for example, JP 2-503077 W and JP 11-207896 A.) comprising the steps of:

(1) thermoforming a laminate, which comprises (a) a transparent or colored acrylic resin layer and (b) a polypropylene resin layer, by a thermoforming method such as a vacuum forming method, to obtain a thermoformed article, (2) inserting said thermoformed article in a mold so as to face the polypropylene resin layer (b) toward inside of the mold, and (3) injecting a polypropylene resin into the mold to obtain a resin molded article having a superior surface in its appearance property, which article comprises said thermoformed article and the polypropylene resin substrate bound with each other.

However, the above-mentioned process has a problem that the laminate used in step (1) easily cracks, and as a result, it is difficult to handle the laminate.

SUMMARY OF THE INVENTION

An object of the present invention is to provide a laminate, which does not crack easily even when used for a process as mentioned above.

Another object of the present invention is to provide a structure comprising such a laminate and a polyolefin resin substrate.

A further object of the present invention is to provide a process for producing such a structure.

The present invention provides a laminate comprising:

(i) a resin layer (A), which comprises a layer containing a propylene resin (a), (ii) a resin layer (B), which comprises a layer containing an acrylic resin (b) having a flexural modulus of from 100 to 1500 MPa, and (iii) a resin layer (C), which comprises a layer containing an acrylic resin (c), wherein the resin layers (A), (B) and (C) are laminated in this order.

Further the present invention provides a structure comprising the above-mentioned laminate and a polyolefin resin substrate, wherein the substrate is bound on the side of the resin layer (A) of said laminate.

Still further, the present invention provides a process (hereinafter referred to as Process-1) for producing a structure, which comprises the steps of:

(1) thermoforming the above-mentioned laminate to obtain a thermoformed article, (2) holding the thermoformed article in a mold for injection molding so as to face the resin layer (A) thereof toward inside of the mold, and (3) injecting a polypropylene resin into the mold to form a substrate, and at the same time forming a structure by binding the thermoformed article to the substrate.

Still further, the present invention provides a process (hereinafter referred to as Process-2) for producing a structure, which comprises the steps of:

(1) thermoforming the above-mentioned laminate to obtain a thermoformed article, (2) extrusion-molding a polyolefin resin to obtain a substrate, and (3) binding the substrate to the surface of the resin layer (A) of the thermoformed article to obtain a structure.

Still further, the present invention provides a process (hereinafter referred to as Process-3) for producing a structure, which comprises the steps of:

(1) thermoforming the above-mentioned laminate to obtain a thermoformed article, (2) injection-molding a polyolefin resin to obtain a substrate, and (3) binding the substrate to the surface of the resin layer (A) of the thermoformed article to obtain a structure.

DETAILED DESCRIPTION OF THE INVENTION

Figure 1:
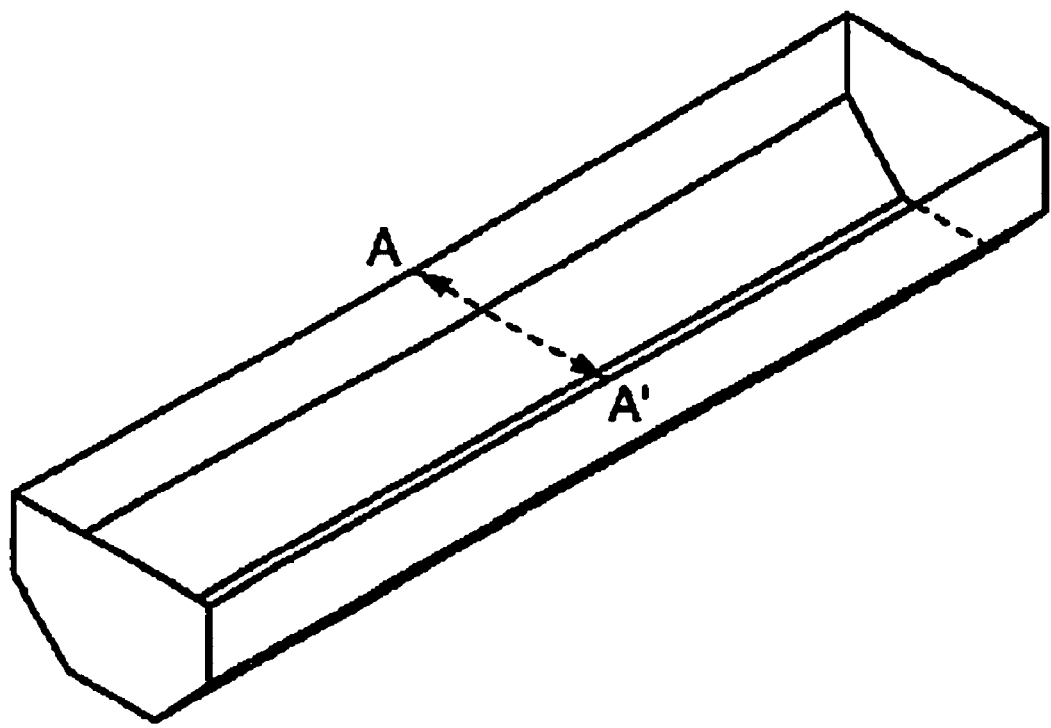
FIG. 1 is a squinting view showing a shape of the thermoformed article obtained by thermoforming the laminate in accordance with the present invention.

The "propylene resin (a)" in the resin layer (A) used in the present invention means a propylene homopolymer; a random or block copolymer comprising 1 to 50 parts by weight of at least one unit selected from the group consisting of a polymerization unit of ethylene (this kind of unit is hereinafter called like "ethylene unit") and α-olefin units having 4 to 20 carbon atoms, and 99 to 50 parts by weight of a propylene unit; a mixture of polymers mentioned above; and a mixture of a propylene homopolymer and an ethylene homopolymer.

Examples of the above-mentioned copolymer are propylene-ethylene copolymer, propylene-butene-1 copolymer and propylene-ethylene-butene-1 terpolymer.

Examples of the above-mentioned α-olefin having 4 to 20 carbon atoms are butene-1, 4-methyl-pentene-1, hexene-1, octene-1, decene-1, octadecene-1, and a combination of two or more α-olefins mentioned above.

Preferable examples of the propylene resin (a) are a propylene-ethylene random copolymer and a combination of a propylene homopolymer and an ethylene homopolymer. A process for producing the propylene resin (a) is not particularly limited, and for example, the propylene resin (a) can be produced according to an ion polymerization process.

From a viewpoint that the thermoformed article obtained in step (1) of the process for producing a structure in accordance with the present invention is prevented from deforming (rounding or curling) with the lapse of time, it is recommendable to use the propylene resin (a) in combination with an inorganic filler and a thermoplastic elastomer.

Examples of the inorganic filler are talc, calcium carbonate, mica, barium sulfate, calcium silicate, clay, magnesium carbonate, alumina, silica and glass fiber reinforcing agents. Of these, talc is preferred.

Examples of the thermoplastic elastomer are an ethylene-propylene copolymer, an ethylene-propylene-conjugated diene copolymer, an ethylene-α-olefin copolymer, a styrene-butadiene-styrene block copolymer, a styrene-isoprene-styrene block copolymer, a styrene-ethylene-butylene-styrene block copolymer and a combination of two or more copolymers mentioned above. Of these, an ethylene-α-olefin copolymer is preferred.

When a resin composition comprising the propylene resin (a), the inorganic filler and the thermoplastic elastomer is used for the resin layer (A), a content of the propylene resin (a) in such a resin composition is from 10 to 98% by weight, preferably from 15 to 80% by weight, and more preferably from 20 to 70% by weight, provided that a weight of the resin composition is 100% by weight, from a viewpoint that the thermoformed article obtained in step (1) of the process for producing a structure in accordance with the present invention is prevented from deforming with the lapse of time.

A content of the inorganic filler in said resin composition is from 1 to 60% by weight, and preferably from 10 to 50% by weight, provided that a weight of the resin composition is 100% by weight, from a viewpoint that the thermoformed article obtained in step (1) of the process for producing a structure in accordance with the present invention is prevented from deforming with the lapse of time.

A content of the thermoplastic elastomer in said resin composition is from 1 to 60% by weight, and preferably from 10 to 50% by weight, from a viewpoint that the thermoformed article obtained in step (1) of the process for producing a structure in accordance with the present invention is prevented from deforming with the lapse of time, and from a viewpoint of lowering rigidity of the resin layer (A).

A total content of the inorganic filler and the themoplastic elastomer in the resin composition is preferably from 30 to 80% by weight from a viewpoint of processability of the laminate in step (1) of the process for producing a structure in accordance with the present invention, from a viewpoint that the thermoformed article obtained in step (1) thereof is prevented from deforming with the lapse of time, and further from a viewpoint of lowering rigidity of the resin layer (A).

A process for producing the resin layer (A) is not particularly limited. For example, the resin layer (A) can be produced according to a conventional extrusion T die molding process. A thickness of the resin layer (A) is not particularly limited, and preferably from 10 to 500 µm measured with a micrometer. The resin layer (A) functions mainly as a substrate layer in the laminate in accordance with the present invention.

The "acrylic resin (b)" in the resin layer (B) used in the present invention means a polymer containing a polymerization unit of at least one monomer selected from the group consisting or acrylic acid, methacrylic acid, acrylic acid esters and methacrylic acid esters (hereinafter referred to as "monomer unit"), and a resin obtained by modifying the above-defined polymer, which resin contains 3 to 30% by weight (provided that a weight of the unmodified polymer is 100% by weight,) of a 6-membered cyclic acid anhydride unit represented by the following formula [I] in the molecule,

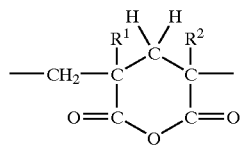

[I]

wherein $R^1$ and $R^2$ are independently of each other a hydrogen atom or an alkyl group having 1 to 5 carbon atoms, and $R^1$ and $R^2$ may be the same or different from each other. Examples of the alkyl group are a methyl group, an ethyl group, a propyl group, an isopropyl group, a butyl group, a t-butyl group, a sec-butyl group and an amyl group.

Examples of the above-mentioned acrylic acid ester are methyl acrylate and ethyl acrylate, and examples of the methacrylic acid ester are methyl methacrylate, ethyl methacrylate, cyclohexyl methacrylate and benzyl methacrylate.

A flexural modulus of the acrylic resin (b) used for the resin layer (B) is from 100 to 1500 MPa, preferably from 500 to 1400 MPa, and more preferably from 800 to 1300 MPa, measured according to a rigid plastic three-point bending test prescribed in JIS-K-7203 (size of a test piece: 12.3 mm×127 mm×3 mm, testing temperature: 23° C.) from a viewpoint that the laminate and the thermoformed article hardly crack during the production process of the structure, and from a viewpoint of improving productability of the thermoformed article. The above-mentioned "productability" means a degree of difference between a shape of a mold used for thermoforming and a shape of a thermoformed article immediately after thermoforming. When the shape of the thermoformed article is substantially the same as that of the mold, it Is said that productability is the best.

As the acrylic resin (b) having the above-defined flexural modulus, it is recommendable to use a multi-phase structure acrylic polymer comprising a phase of an acrylic rubber elestomer and a phase of an acrylic rigid polymer. A content of the multi-phase structure acrylic polymer in the acrylic resin (b) is preferably from 30 to 100% by weight, and more preferably from 50 to 95% by weight, provided that the weight of the acrylic resin (b) is 100% by weight, from a viewpoint that the laminate and the thermoformed article hardly crack during the production process of the structure, and from a viewpoint of improving productability of the thermoformed article. When the content of the multi-phase structure acrylic polymer in the acrylic resin (b) is not 100% by weight, the remaining resin component is not limited. For example, the remaining resin component may be the acrylic resin (c) mentioned below.

Examples of the above-mentioned multi-phase structure acrylic polymer are (1) a two-phase structure acrylic polymer, which have an inner phase comprising an acrylic rubber elastomer and an outer phase comprising an acrylic rigid polymer, and (2) a three-phase structure acrylic polymer, which have an innermost phase comprising an acrylic rigid polymer, an intermediate phase comprising an acrylic rubber elastomer and an outermost phase comprising an acrylic rigid polymer. Of these, preferred is said two-phase structure acrylic polymer.

A particle diameter of the rubber in the above-mentioned inner phase, namely the acrylic rubber elastomer, is generally from 10 to 500 nm, preferably from 10 to 200 nm, and more preferably from 10 to 100 nm, from a viewpoint that the laminate and the thermoformed product hardly crack during the production process of the structure, and from a viewpoint of improving productability of the thermoformed article. Incidentally, from two points of view as mentioned above, the under limit value of the particle diameter may be less than 10 nm. However, it is difficult to obtain the multi-phase structure acrylic polymer having a particle diameter of less than 10 nm. It is possible to control the particle diameter by adjusting an amount of an emulsifier used for the production of the acrylic rubber elastomer. When the emulsifier is increased, the particle diameter becomes small. When it is decreased, the particle diameter becomes large. The particle diameter can be measured by a method comprising the steps of:

(i) pelletizing the multi-phase structure acrylic polymer, (ii) dyeing a part of the acrylic rubber elastomer in a cross section of the pellet with ruthenium oxide, and (iii) observing the dyed part with a transmission electron microscope to measure the diameter of rubber in the acrylic rubber elastomer.

As the acrylic rubber elastomer in the above-mentioned multi-phase structure acrylic polymer, it is recommendable to use a copolymer, which comprises 50 to 99% by weight of an acrylic acid alkyl ester unit having an alkyl group of 1 to 8 carbon atoms, 0 to 49% by weight of a methacrylic acid alkyl ester unit having an alkyl group of 1 to 4 carbon atoms, and 1 to 30% by weight of a cross-linking monomer unit. If desired, such an acrylic rubber elastomer may contain an unsaturated monomer unit such as an ethylene unit.

As the acrylic rigid polymer in the above-mentioned multi-phase structure acrylic polymer, it is recommendable to use a copolymer, which comprises 50 to 99% by weight of a methacrylic acid alkyl ester unit having an alkyl group of 1 to 4 carbon atoms, and 1 to 50% by weight of an acrylic acid alkyl ester unit having an alkyl group of 1 to 8 carbon atoms. If desired, such an acrylic rigid polymer may contain an unsaturated monomer unit such as an ethylene unit.

Examples of the above-mentioned acrylic acid alkyl ester having an alkyl group of 1 to 8 carbon atoms are methyl acrylate, ethyl acrylate, propyl acrylate, butyl acrylate, 2-ethylhexyl acrylate, n-octyl acrylate and a combination of two or more monomers mentioned above.

Examples of the above-mentioned methacrylic acid alkyl ester having an alkyl group of 1 to 4 carbon atoms are methyl methacrylate, ethyl methacrylate, propyl methacrylate, butyl acrylate and a combination of two or more monomers mentioned above.

Examples of the above-mentioned cross-linking monomer are ethylene glycol di(meth)acrylate, diethylene glycol di(meth)acrylate, triethylene glycol di(meth)acrylate, trimethylolpropane tri(meth)acrylate, tetramethylolmethane tetra(meth)acrylate, dipropylene glycol di(meth)acrylate, divinylbenzene, diallyl phthalate, diallyl maleate, divinyl adipate, allyl (meth)acrylate and triallyl isocyanurate.

Examples of the above-mentioned monomer capable of giving the unsaturated monomer unit such as an ethylene unit are vinyl halides, vinyl cyanides, vinyl ester compounds, aromatic vinyl compounds and their derivatives, vinylidene halides, (meth)acrylic acids and their salts, and (meth)acrylic acid esters.

A process for producing the above-mentioned multi-phase structure acrylic polymer is not particularly limited and may be a conventional one (referred to, for example, JP 54-33277 B). As a process for producing the above-mentioned two-phase structure acrylic polymer, there is exemplified a process comprising the steps of:

(1) polymerizing a monomer mixture comprising an acrylic acid alkyl ester, a methacrylic acid alkyl ester and a cross-linking monomer in each pre-determined amount in the presence of a coagent such as a polymerization initiator and an emulsifier, thereby obtaining an acrylic rubber elastomer emulsion, and (2) adding a methacrylic acid alkyl ester and an acrylic acid alkyl ester in each pre-determined amount to the acrylic rubber elastomer emulsion, and polymerizing them to form an acrylic rigid polymer layer around the acrylic rubber elastomer, whereby the desired two-phase structure acrylic polymer can be obtained.

If desired, the acrylic resin (b) used in the present invention may be used in combination with antioxidants such as hindered phenol antioxidants, phosphorus antioxidants and sulfur antioxidants; ultraviolet absorbers such as benztriazole ultraviolet absorbers and benzophenone ultraviolet absorbers; weather resistants such as hindered amine light resistants; flame retarders; colorants; pigments; dyes; or inorganic fillers, which are all known in the art.

The resin layer (B) is preferably a decorated layer such as a printed layer, a colored layer or a combination thereof. The colored layer can be obtained using a combination of the acrylic resin (b) and a coloring agent. The coloring agent is not particularly limited, and may be an inorganic pigment, an organic pigment and a dye. Examples of the coloring agent are carbon black, titanium oxide, kaolin clay, zinc whites iron oxide red, permanent red, molybdate orange, cobalt blue, ultramarine blue, phthalocyanine blue, manganese violet and a combination of two or more coloring agents mentioned above. In order to obtain a decorated layer of a metal like tone or a pearl like tone, it is permitted to use a combination of the acrylic resin (b) and an aluminum flake or a pearl pigment.

A process for producing the above-mentioned printed layer is not particularly limited, and it is possible to obtain the printed layer according to a conventional process. Examples of said process are a gravure printing process, a screen printing process and an ink jet printer printing process making use of a computer graphic technology. Printing ink used is not particularly limited. Examples thereof are urethane base ink, vinyl acetate-acrylic base ink and water base ink.

As the acrylic resin (c) in the resin layer (C) used in the present invention, there are exemplified a resin containing at least one main unit selected from the group consisting of an acrylic acid unit, a methacrylic acid unit, an acrylic acid ester unit and a methacrylic acid ester unit: and a resin composition comprising at least two resins mentioned above. The acrylic resin (c) may be used in combination with a fluororesin such as a polyfluorovinylidene, or with a resin containing a combination of the above-mentioned unit and a styrene unit (MS resin).

The acrylic resin (c) maybe a resin containing a 6-membered cyclic acid anhydride unit as defined by the above formula [I] in a molecule, which can be obtained by modifying the resin containing at least one main unit selected from the group consisting of an acrylic acid unit, a methacrylic acid unit, an acrylic acid ester unit and a methacrylic acid ester unit. A content of the 6-membered cyclic acid anhydride unit is from 3 to 30% by weight, and preferably from 5 to 25% by weight, provided that the weight of the modified resin is 100% by weight, from a viewpoint of obtaining the modified resin superior in its heat resistance and its molding processability.

The content of the 6-membered cyclic acid anhydride unit represented by the above formula [I] contained in the polymer is usually from 3 to 30% by weight and preferably from 5 to 25% by weight, which content increases the heat resistance and does not increase melting viscosity (namely, the molding processability is good).

The resin containing the 6-membered cyclic acid anhydride unit represented by the above formula [I] can be obtained by heat treating the resin to be modified at 150 to 350° C., and preferably 220 to 320° C. in the presence of a basic compound such as sodium hydroxide, potassium hydroxide and sodium methylate.

The acrylic resin (c) may be used in combination with the above-mentioned multi-phase structure acrylic polymer. As such a combination, there is exemplified a resin composition, which comprises (1) 95 to 50 parts by weight of an acrylic resin (c) having a glass transition temperature of 60 to 110° C. and a weight average molecular weight of 70,000 to 600,000, measured by a gel permeation chromatography (GPC), wherein the weight average molecular weight means a value converted into a weight average molecular weight of polymethyl methacrylate, and (2) 5 to 50 parts by weight of a multi-phase structure acrylic polymer. As such a multi-phase structure acrylic polymer, there are exemplified (1) a two-phase structure acrylic polymer, which has (i) an inner phase of a rubber elastomer comprising a copolymer of an acrylic acid alkyl ester having an alkyl group of 4 to a carbon atoms and a polyfunctional monomer and (ii) an outer phase of a rigid polymer comprising a methyl methacrylate unit as a main unit, and (2) a three-phase structure acrylic polymer, which has (i) an innermost phase of a rigid polymer comprising a methyl methacrylate unit as a main unit, (ii) an intermediate phase of a rubber elastomer comprising a copolymer of an acrylic acid alkyl aster having an alkyl group of 4 to 8 carbon atoms and a polyfunctional monomer and (iii) an outermost phase of a rigid polymer comprising a methyl methacrylate unit as a main unit. These multi-phase structure acrylic polymers can be produced by a conventional process (refer to, for example, JP 54-33277 B and JP 55-27576 B).

A flexural modulus measured according to the above-mentioned JIS-K-7203 of the acrylic resin (a) used in the present invention is preferably more than 1500 MPa but not more than 4000 MPa, more preferably from 1700 to 3500 MPa, and the most preferably from 2300 to 3300 MPa, in order to obtain a laminate having a superior balance between surface hardness and brittleness.

If desired, the acrylic resin (c) maybe used in combination with antioxidants such as hindered phenol antioxidants, phosphorus antioxidants and sulfur antioxidants; weather resistants such as ultraviolet absorbers and hindered amine light resistants; flame retarders; colorants; pigments; dyes; or inorganic fillers, which are all known in the art. As the ultraviolet absorber, a high molecular weight benztriazole ultraviolet absorber such as 2,2-methylenebis [4-(1,1,3,3-tetramethylbutyl)-6-(2H-benztriazol-2-yl)phenol] is preferable from a viewpoint that such an ultraviolet absorber does not evaporate easily from the laminate, and the resin layers (A) and (B) are prevented from deteriorating. The ultraviolet absorber is added preferably in amount of generally not less than 1000 ppm.

It is preferable that the resin layer (C) is a transparent layer and an outermost layer of the structure, so that the structure can exhibit extremely superior deepening property when observed from the side of the resin layer (C).

The resin layers (B) and (C) can be obtained by molding the acrylic resin (b) and the acrylic resin (c) into films, respectively, according to a molding process such as a T die extrusion process and a calendering process. In view of thickness accuracy and surface smoothness of the laminate obtained, it is recommendable to use an extrusion molding process comprising the step of using a roll or a metal belt, thereby contacting both surfaces of the extrudate with a surface of the roll or that of the metal belt. Any foreign substance, which is contained in the resin layers (B) and/or (C) and has a particle diameter of as small as not more than 100 μm, deteriorates appearance and printing property thereof. Therefore, in film-making, it is recommendable to arrange a screen mesh such as a metal made screen mesh or a sintered ceramics made screen mesh at respective flow paths of the molten acrylic resins (b) and (c), in order to prevent the foreign substance from entering the resin layers (B) and (C). From a viewpoint that plugging hardly occurs, or even when plugging occurs, it is not frequent to discontinue the production step for removing the plugged matter, a rotary type screen changer manufactured by Gneuss in Germany is exemplified as a preferred screen mesh. By using the rotary type screen changer, it is possible to obtain the resin layers (B) and (C), which contain substantially no foreign substance having a particle diameter of not more than 100 μm.

A thickness of the resin layer (B) is usually from 20 to 400 μm, and preferably from 70 to 250 μm measured with a micrometer.

A thickness of the resin layer (C) is usually from 10 to 300 μm, and preferably from 30 to 150 μm measured in that manner.

As a process for producing the laminate in accordance with the present invention, the following processes are exemplified.

(1) A multi-layer extrusion process comprising the steps of (i) extrusion-molding respective resin layer (A), resin layer (B) and resin layer (C) at the same time, and (ii) laminating immediately thereafter those layers.

(2) A process comprising the steps of (i) extrusion-molding respective resin layer (A), resin layer (B) and resin layer (C) independently, and (ii) laminating those layers.

(3) A process comprising the steps of (i) extrusion-molding any one of the resin layer (A), the resin layer (B) or the resin layer (C), and (ii) laminating immediately thereafter the remaining layers one after another on said extrusion-molded layer still in a hot state.

Both surfaces of the laminate immediately after the lamination according to the above-mentioned processes may be contacted with a surface of a roll or that of a belt.

Particularly, it is recommendable to use a process comprising the steps of:

(1) laminating the resin layer (B) and the resin layer (C) to obtain a precursory laminate, and (2) further laminating the resin layer (A) on the resin layer (B) of the precursory laminate with an adhesive.

The adhesive used in the above-mentioned step (2) is not particularly limited. Examples thereof are chlorinated polypropylene adhesives and dry laminate adhesives for film use such as polyester adhesives, polyurethane adhesives and polyacrylate adhesives, which are all known in the art.

It is permitted to apply the adhesive on any of the resin layer (A) and the resin layer (B). It is recommendable to apply a corona discharge treatment to a binding surface of the resin layer (A) at a corona discharge density of from 75 to 150 W min./m$^2$ in advances or to blow ozone to the binding surface at a temperature of from 180 to 340° C., preferably from 220 to 320° C., and more preferably from 250 to 300° C. at a density of from 5 to 50 mg/m$^2$, in order to increase the adhesion between the resin layers (A) and (B).

If desired, the laminate in accordance with the present invention may have an additional layer other than the resin layers (A), (B) and (C).

The "polyolefin resin" used for the substrate of the structure in accordance with the present invention means a thermoplastic polymer selected from the group consisting of ethylene homopolymers; homopolymers of α-olefin having 3 to 20 carbon atoms; copolymers containing an ethylene unit and at least two units selected from the group consisting of units of the above-defined α-olefin, wherein a content of the α-olefin unit is from 51 to 99% by weight, provided that a total unit in the copolymer is 100% by weight; or combinations of at least two polymers selected from the group consisting of the above-defined homopolymers and the above-defined copolymers.

Examples of the α-olefin are propylene, butene-1, pentene-1, hexene-1, octene-1, decene-1 and octadecene-1.

Examples of the polyolefin resin are ethylene homopolymers; α-olefin homopolymers such as propylene homopolymers, butene homopolymers and 4-methylpentene-1 homopolymers; low density polyethylene obtained according to a radical polymerization process; high density polyethylene obtained according to an ion polymerization process; propylene-ethylene-butene-1 terpolymers; and propylene-ethylene block copolymers.

The polyolefin resin may be used in combination with a modifier Including, for example, elastomers such as a styrene elastomer and fillers.

In order to obtain a structure having a low mold shrinkage, preferred resins for the substrate are (1) a combination of 95 to 60% by weight of the polyolefin resin and 5 to 40% by weight of an inorganic filler such as talc, provided that a total of the polyolefin resin and the inorganic filler is 100% by weight: and (2) a polyolefin resin having a coefficient of linear thermal expansion of not more than $1.0 \times 10^{-4}$ (length/° C.) measured at 20 to 100° C.

As a method of thermoforming carried out in step (1) of Process-1, Process-2 and Process-3 in accordance with the present invention, there are exemplified methods such as a vacuum molding method, a press molding method and a vacuum press molding method. In step (1) of Process-1, the laminate is thermoformed so as to obtain a shape agreeable to the shape of the mold used in step (2). In step (2), the thermoformed article obtained in step (1) is held in a manner such that the resin layer (A) constituting the thermoformed article faces toward inside of the mold. In other words, the resin layer (C) of the thermoformed article contacts closely with an inner wall of the mold.

It is permitted to carry out steps (1) and (2) of Process-1 using an injection molding machine equipped with an injection mold (in-moldable mold), which machine has (a) an apparatus for supplying the laminate in the mold so as to face the resin layer (A) thereof toward inside of the mold, (b) an apparatus for heating the laminate supplied, and (c) an apparatus for applying suction to the laminate heated by means of a suction apparatus such as a vacuum pump. In this case, the thermoforming in step (1) is carried out while applying suction to the laminate heated by means of the auction apparatus, thereby completing steps (1) and (2) simultaneously.

The structure in accordance with the present invention can be obtained according to Process-2 comprising the steps of:
(1) thermoforming the laminate to obtain a thermoformed article,
(2) extrusion-molding a polyolefin resin to obtain a substrate, and
(3) binding the substrate to the surface of the resin layer (A) of the thermoformed article, thereby obtaining the desired structure.

Further, the structure In accordance with the present invention can be obtained according to Process-3 comprising the steps of:
(1) thermoforming the laminate to obtain a thermoformed article,
(2) injection-molding a polyolefin resin to obtain a substrate, and
(3) binding the substrate to the surf ace of the resin layer (A) of the thermoformed article, thereby obtaining the desired structure.

A shape of the structure in accordance with the present invention is not particularly limited, and can be determined depending upon uses of the structure. Examples of the shape are those of car parts such as car interior or exterior parts, those of household electric appliance parts and those of signboards.

In order to obtain the structure having a superior adhesion between the laminate and the substrate, it is recommendable to use a resin composition, as the resin layer (A) of the laminate, comprising 10 to 98% by weight of the propylene resin (a), 1 to 60% by weight of the inorganic filler and 1 to 60% by weight of the thermoplastic elastomer.

In the case that an outermost layer of a structure in accordance with the present invention is the resin layer (C) having superior transparency, it is possible to obtain a structure, whose surface has superior transparency and superior surface glossing property when observed from a side of the resin layer (C), and has a 60° specular gloss of not less than 80%, and preferably not less than 90%, measured according to JIS-K-7105.

Further in the case that an outermost layer of a structure in accordance with the present invention is the resin layer (C) having a superior scratch resistance, it is possible to obtain a structure having a pencil hardness of not less than B, or not less than 2H, or not less than 4H, which hardness is a parameter of the scratch resistance.

As uses of the structure in accordance with the present invention, there are exemplified car parts such as car interior or exterior parts, household electric appliance parts, parts of miscellaneous goods and signboards. Particularly when the structure in accordance with the present invention is used for parts such as car parts and household electric appliance parts, such parts can be obtained easily and chiefly, because neither painting nor coating is required to add appearance property thereto. Further, when the structure in accordance with the present invention is used for signboards, it is possible to punch the structure into not only a linear shape but also a curved shape, because the structure has the substrate comprising the polyolefin resin having a high flexibility, and as a result, it is possible to make signboards having various shapes.

EXAMPLE

The present invention is explained with reference to Examples as follows, which are not intended to limit the scope of the present invention.

Example 1

(1) Preparation of Resin Layer (A)

A propylene-ethylene copolymer, a trade name of SUMITOMO NOBLEN (melt flow rate=1.5 g/min, measured at 230° C. under a load of 2.16 kg, ethylene unit and propylene unit contents are 5% by weight and 95% by weight, respectively, provided that a weight of the propylene-ethylene copolymer is 100% by weight) (abbreviated as "PP-1" in Table 1) was extrusion-molded at a cylinder temperature of 260° C. using a T-die film processing machine, thereby obtaining a resin layer (A) having a thickness of 200 μm.

(2) Preparation of Pellet for Resin Layer (B)

80 Parts by weight of a two-phase structure acrylic polymer powder obtained according to Example 3, B-1, of JP 54-33277 B, and 20 parts by weight of methyl methacrylate-methyl acrylate copolymer beads containing 90% by weight of a methyl methacrylate unit and 10% by weight of a methyl acrylate unit (reduced viscosity=0.06 L/g) were mixed using a tumbler mixer, and then melt-kneaded using a twin screw extruder, thereby obtaining a pellet.

A flexural modulus of the pellet was found to be 1,150 MPa, measured according to a rigid plastic three-point banding test prescribed in JIS-K-7203 (size of a test piece: 12.3 mm×127 mm×3 mm, testing temperature: 23° C.).

The above-mentioned two-phase structure acrylic polymer powder had (1) an inner phase comprising a butyl acrylate-methyl methacrylate-triallyl isocyanate copolymer (rubber elastomer), which contained 85% by weight of a butyl acrylate unit, 14.9% by weight of a methyl methacrylate unit and 0.1% by weight of a triallyl isocyanate unit, and (2) an outer phase comprising a methyl methacrylate-butyl acrylate copolymer (rigid polymer), which contained 90% by weight of a methyl methacrylate unit and 10% by weight of a butyl acrylate unit. A particle diameter of the rubber contained in the above-mentioned rubber elastomer was found to be 73 nm, measured by observing the rubber elastomer portion dyed with ruthenium oxide using a transmission electronic microscope.

97.99 Parts by weight of the above pellet, 2 parts by weight of aluminum powder having an average particle diameter of 38 $\mu$m, manufactured by Toyo Aluminium K.K., and 0.01 part by weight of titanium yellow dye were melt kneaded at a resin temperature of 265° C. using a 40 mm single screw extruder manufactured by Tanabe Plastic Machine Co., Ltd., thereby obtaining a silver color pellet (pellet for resin layer (B) (abbreviated as "B-1" in Table 1).

(3) Preparation of Pellet for Resin Layer (C)

A methyl methacrylate-methyl acrylate copolymer comprising 94% by weight of a methyl methacrylate unit and 6% by weight of a methyl acrylate unit (reduced viscosity=0.08 L/g) was produced according to a bulk polymerization process.

Successively, a pellet (pellet for resin layer (C)), (abbreviated as "C-1" in Table 1) was produced using 99.5 parts by weight of the above-mentioned copolymer and 0.5 part by weight of a benztriazole ultraviolet absorber, a trade name of ADEKASTAB-LA31, manufactured by Asahi Denka Kogyo K.K.

A flexural modulus of the pellet was found to be 3,200 MPa, measured according to the same method as that mentioned above.

(4) Preparation of Precursory Laminate Comprising Resin Layer (B) and Resin Layer (C)

The captioned precursory laminate was produced by a process comprising the steps of:

(i) melting the above-mentioned pellets for resin layers (B) and (C) using two sets of single screw extruders (temperature set=260° C.), respectively, (ii) molding respective molten products into respective layers through a feed block (temperature set=280° C.), (iii) laminating said two layers, and then extruding the layered product from a T-die (temperature set=280° C.), and (iv) cooling the extrudate in a molten state by sandwiching between a first roll and a second roll of a molding roll equipped with three polishing rolls (roll temperature=70° C.) so as to be contacted with both rolls, thereby obtaining a precursory laminate comprising the resin layer (B) (thickness 200 $\mu$m) and the resin layer (C) (thickness=100 $\mu$m).

(5) Production of Laminate Comprising Resin Layer (A), Resin Layer (B) and Resin Layer (C)

The captioned laminate was produced by a process comprising the steps of:

(i) coating an adhesive on a surface of the resin layer (B) of the precursory laminate obtained in the above (4) at an application quantity of 7 g/m$^2$, (ii) drying the coated surface at 80° C. for about 1 minute, (iii) binding the coated surface and the corona discharge-treated surface of the resin layer (A) with a laminate roll set at 90° C., and (iv) aging the resulting laminate at 40° C. for 72 hours to obtain the desired laminate comprising the resin layer (A), the resin layer (B) and the resin layer (C).

The above-mentioned adhesive was prepared by mixing 100 parts by weight of a polyurethane adhesive, a trade name of TKS3989, manufactured by Toyo Morton, and 4 parts by weight of an isocyanate hardener, a trade name of CAT-RT, manufactured by that company, and then diluting the resulting mixture with toluene.

(6) Production of Thermoformed Article

The captioned thermoformed article was produced by a process comprising the steps of:

(i) fixing the laminate obtained In the above (5) to a heating zone of a vacuum molding machine, a trade name of CUPF1015-PWB, manufactured by Fuseshinku Co. Ltd., (ii) heating both surfaces of the fixed laminate with a far infrared heater until a temperature of the surface reaches 180° C., (iii) contacting the heated laminate with a mold, (iv) removing air between the laminate and the mold with a vacuum pump to form the laminate into a shape of the mold, and (v) cooling the formed laminate with a fan to obtain the desired thermoformed article having a shape as shown in FIG. 1.

(7) Evaluation of Crack Resistance

Crack resistance of the laminate used in the above (6), and that of the thermoformed article obtained in the above (6) were evaluated based on four ranks according to the following criteria. The results are as shown in Table 1.

⊚: No crack
○: Almost no crack
Δ: Sometimes cracks
X: Very easily cracks (8) Evaluation of Productability of Thermoformed Article Difference between the shape of the thermoformed article obtained in the above (6) and that of the mold used in the above (6) was visually observed and evaluated based on four ranks according to the following criteria. The results are as shown in Table 1.

⊚: The shape of the thermoformed article is substantially the same as that of the mold.
○: The shape of the thermoformed article is approximately the same as that of the mold.
Δ: A part of the shape of the thermoformed article is not the same as that of the mold.
X: The shape of the thermoformed article is not the same as that of the mold.

(9) Evaluation of Elapsing Deformation of Thermoformed Article

The captioned deformation was evaluated by a method comprising the steps of:

(i) trimming the thermoformed article obtained in the above (6) along its shape, (ii) putting the trimmed thermoformed article on a table horizontally for a week, and (iii) deducting a length of distance A-A' of the thermoformed article after putting for a week from a length (34 mm) of the mold corresponding to distance A-A' in FIG. 1, evaluating the elapsing deformation based on the difference obtained.

A structure was produced using the thermoformed article obtained in the above (6), and a surface appearance of the obtained structure was visually observed. The results are as shown in Table 1.

Comparative Example 1

Example 1 was repeated, except that 40 parts by weight of a three-phase structure acrylic polymer fine particle produced according to Example 3 of JP 55-27576 B, 40 parts by weight of a pellet of a methyl methacrylate-methyl acrylate copolymer (reduced viscosity=0.06 L/g) comprising 95% by weight of a methyl methacrylate unit and 5% by weight of a methyl acrylate unit, which had been produced by a bulk polymerization process, and 20 parts by weight of a methyl methacrylate-methyl acrylate copolymer bead (reduced viscosity=0.06 L/g) comprising 90% by weight of a methyl methacrylate unit and 10% by weight of a methyl acrylate unit, which had been produced by a suspension polymerization process, were mixed with a tumbler mixer and then melt-kneaded with a twin screw extruder to obtain a pellet (flexural modulus=1800 MPa, measured according to the same measurement method as that mentioned above), which was used as a pellet for resin layer (B) (abbreviated as "B-2" in Table 1). Thereby, a laminate, a thermoformed article and a structure were produced, respectively, which were evaluated according to the same methods as those in Example 1. Results are as shown in Table 1.

The above-mentioned three-phase structure acrylic polymer fine particle had (1) an innermost phase comprising a methyl methacrylate-diallyl maleate cross-linked copolymer, which contained 99.8% by weight of a methyl methacrylate unit and 0.2% by weight of diallyl maleate unit, (2) an intermediate layer comprising a butyl acrylate-styrene-diallyl maleate copolymer (rubber elastomer), which contained 79.5% by weight of a butyl acrylate unit, 18.5% by weight of a styrene unit and 2.0% by weight of a diallyl maleate unit, and (3) an outermost layer comprising a methyl methacrylate-ethyl acrylate copolymer, which contained 96% by weight of a methyl methacrylate unit and 4% by weight of an ethyl acrylate unit. A particle diameter of rubber in the above-mentioned rubber elastomer was found to be 300 mm, measured by the same method as that mentioned above.

Example 2

Example 1 was repeated, except that there was used a resin composition, as the resin layer (A), which resin composition comprised (i) 27 parts by weight of a mixture, a trade name of SUMITOMO NOBLEN, manufactured by Sumitomo Chemical Co., Ltd. (melt flow rate=0.5 g/10 min., measured at 230° C. under load of 2.16 kg) (abbreviated as "PP-2" in Table 1), containing 85% by weight of propylene homopolymer and 15% by weight of low density polyethylene, (ii) 30 parts by weight of an ethylene-butane copolymer, a trade name of ESRRENE SPO N0416, manufactured by Sumitomo Chemical Co., Ltd. (ethylene unit content=78% by weight, butene unit content=22% by weight, melt flow rate=13 g/10 min., measured at 230° C. under load of 2.16 kg) (abbreviated as "EBR" in Table 1), and (iii) 43 parts by weight of a talc master batch comprising 70% by weight of a talc, a trade name of TALK JR46, manufactured by Hayashi Kasei K.K. and 30% by weight of homopolypropylene (melt flow rate=120 g/10 min., measured at 230° C. under load of 2.16 kg) (abbreviated as "PPMB" in Table 1), (therefore, 43 parts by weight of the talc master batch contained 30 parts by weight of talc and 13 parts by weight of the homopolypropylene). Thereby, a resin layer (A), a laminate, a thermoformed article and a structure were produced, respectively, which were evaluated according to the same methods as those in Example 1. Results are as shown in Table 1.

TABLE 1

|  | Example 1 | Comparative Example 1 | Example 2 |
|---|---|---|---|
| Resin layer (A) |  |  |  |
| Component(s) and blending ratio (% by weight) | PP-1: 100 | PP-1: 100 | PP-2: 27 PPMB: 13 EBR: 30 talc: 30 |
| Resin layer (B) |  |  |  |
| Resin | B-1 | B-2 | B-1 |
| Flexural modulus (MPa) | 1150 | 1800 | 1150 |
| Resin layer (C) |  |  |  |
| Resin | C-1 | C-1 | C-1 |
| Flexural modulus (MPa) | 3200 | 3200 | 3200 |
| Crack resistance | ⊚ | X | ⊚ |
| Productability | ⊚ | Δ | ⊚ |
| Elapsing deformation (mm) | 19 | 19 | 0 |
| Surface appearance of structure | good | bad | good |

What is claimed is:

1. A laminate comprising:
   (i) a resin layer (A), which comprises a layer containing a propylene resin (a),
   (ii) a resin layer (B), which comprises a layer containing an acrylic resin (b) having a flexural modulus of from 100 to 1500 MPa, and
   (iii) a resin layer (C), which comprises a layer containing an acrylic resin (c),
   wherein the resin layers (A), (B) and (C) are laminated in this order.

2. The laminate according to claim 1, wherein the acrylic resin (b) in the resin layer (B) comprises a multi-phase structure acrylic polymer, which contains a phase containing an acrylic rubber elastomer and a phase containing an acrylic rigid polymer.

3. The laminate according to claim 1, wherein the flexural modulus of the acrylic resin (c) in the resin layer (C) is higher than 1500 MPa but not higher than 4000 MPa.

4. The laminate according to claim 1, wherein the resin layer (B) is a decorated layer and the resin layer (C) is a transparent layer.

5. The laminate according to claim 1, wherein the resin layer (C) is a surface layer of the laminate.

6. The laminate according to claim 1, wherein the resin layer (A) comprises a layer, which contains a resin composition comprising:
   (1) 10 to 98% by weight of a propylene resin,
   (2) 1 to 60% by weight of an inorganic filler, and
   (3) 1 to 60% by weight of a thermoplastic elastomer,
   provided that a total weight of the components (1) to (3) is 100% by weight.

7. The laminate according to claim 6, wherein the thermoplastic elastomer contains an ethylene-α-olefin copolymer.

8. The laminate according to claim 6, wherein the inorganic filler contains talc.

9. A structure comprising the laminate according to claim 1 and a polyolefin resin substrate, wherein the substrate is bound on the side of the resin layer (A) of said laminate.

* * * * *